United States Patent
Moon et al.

(10) Patent No.: US 10,163,182 B2
(45) Date of Patent: Dec. 25, 2018

(54) COMMAND INPUT METHOD AND DISPLAY SYSTEM

(71) Applicant: SAMSUNG DISPLAY CO., LTD., Yongin Si, Gyeonggi-Do (KR)

(72) Inventors: Gyeong-ub Moon, Cheonan-si (KR); Ga-na Kim, Icheon-si (KR); Sangho Park, Seongnam-si (KR); Jae-won Jeong, Seoul (KR); Ji-woong Jeong, Yongin-si (KR); Kyung-uk Choi, Gunpo-si (KR)

(73) Assignee: Innovation Counsel LLP (KR)

( * ) Notice: Subject to any disclaimer, the term of this patent is extended or adjusted under 35 U.S.C. 154(b) by 178 days.

(21) Appl. No.: 14/994,012

(22) Filed: Jan. 12, 2016

(65) Prior Publication Data

US 2016/0217762 A1    Jul. 28, 2016

(30) Foreign Application Priority Data

Jan. 28, 2015   (KR) .................. 10-2015-0013708

(51) Int. Cl.
   *G06T 1/20*    (2006.01)
   *G09G 5/00*    (2006.01)
   *G09G 3/20*    (2006.01)
   *G09G 3/34*    (2006.01)

(52) U.S. Cl.
   CPC ............. *G06T 1/20* (2013.01); *G09G 3/20* (2013.01); *G09G 3/2096* (2013.01); *G09G 3/3406* (2013.01); *G09G 5/006* (2013.01)

(58) Field of Classification Search
   None
   See application file for complete search history.

(56) References Cited

U.S. PATENT DOCUMENTS

| | | | | |
|---|---|---|---|---|
| 2004/0218625 A1* | 11/2004 | Kobayashi | ............. | G09G 5/006 |
| | | | | 370/463 |
| 2008/0170643 A1* | 7/2008 | Lee | ............. | H03M 9/00 |
| | | | | 375/340 |
| 2011/0242066 A1* | 10/2011 | Jeon | ............. | G09G 3/20 |
| | | | | 345/204 |

FOREIGN PATENT DOCUMENTS

| KR | 10-0986041 B1 | 10/2010 |
|---|---|---|
| KR | 10-2011-0066507 A | 6/2011 |
| KR | 10-2011-0091383 A | 8/2011 |
| KR | 10-2013-0020338 A | 2/2013 |
| KR | 10-1263185 B1 | 5/2013 |
| KR | 10-1367279 B1 | 2/2014 |

OTHER PUBLICATIONS

No Author, "Morse Code," Wikipedia, the free Encyclopedia, retrieved Jul. 1, 2015, 33 pages, Internet: <https://en.wikipedia.org/wiki/Morse_code>.

(Continued)

*Primary Examiner* — Vu Nguyen
(74) *Attorney, Agent, or Firm* — Innovation Counsel LLP

(57) ABSTRACT

A command input method includes: converting an original pixel data into command embedded pixel data based on a command to control a device, the command being embedded in the command embedded pixel data; transmitting the command embedded pixel data from a host to the device; extracting the command from the command embedded pixel data; and controlling the device according to the extracted command.

11 Claims, 13 Drawing Sheets

(56) References Cited

OTHER PUBLICATIONS

No Author, "VESA DisplayPort Standard," Video Electronics Standards Association (VESA), Jan. 5, 2010, 515 pages, Version 1, Revision 2, Milpitas, CA, US.
No Author, "VESA Embedded DisplayPort Standard," Video Electronics Standards Association (VESA), Jan. 13, 2011, 81 pages, Version 1.3, Newark, CA, US.
No Author, "VESA DisplayPort(TM) Link Layer Compliance Test Proposal," Video Electronics Standards Association, Nov. 25, 2008, 195 pages, Version 1.1, Milpitas, CA, US.
No Author, "A CMOS 5.4Gbps / 3.24Gbps Dual-Rate Clock and Data Recovery Design," Creative Commons, Commons Deed, INHA University, Feb. 2010, 78 pages.
No Author, "A Spread Spectrum Clock Generator for DisplayPort," Creative Commons, Commons Deed, INHA University, Feb. 2009, 66 pages.
No Author, "Main Link Design and Implementation for DisplayPort Interface," Creative Commons, Commons Deed, INHA University, Feb. 2009, 53 pages.

\* cited by examiner

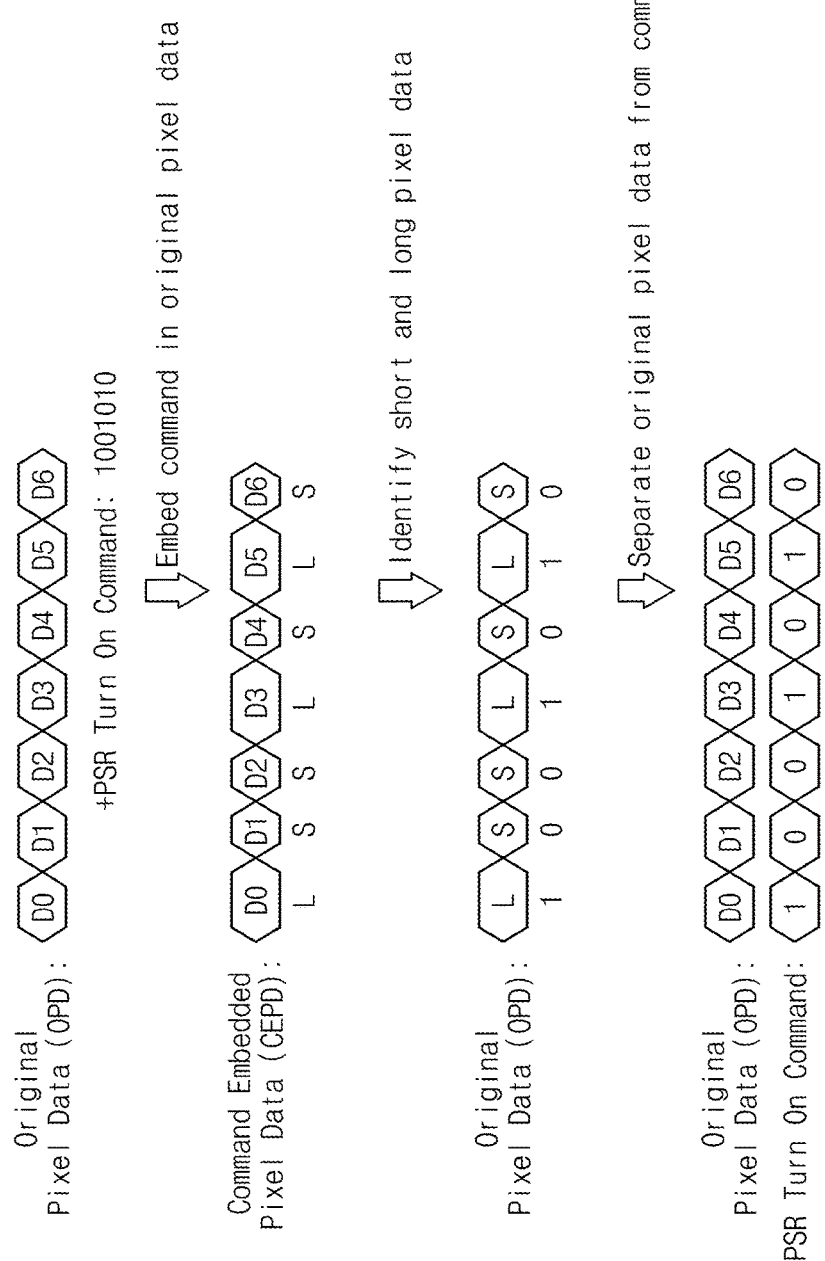

COMMAND INPUT METHOD AND DISPLAY SYSTEM

CROSS-REFERENCE TO RELATED APPLICATIONS

This U.S. non-provisional patent application claims priority under 35 U.S.C. § 119 of Korean Patent Application No. 10-2015-0013708, filed on Jan. 28, 2015, the disclosure of which is hereby incorporated by reference in its entirety.

BACKGROUND

The present disclosure herein relates to a command input method of a display device and a display system.

Interfaces may be largely classified into internal interfaces and external interfaces. The external interfaces may be implemented through at least one of low voltage differential signaling (LVDS), DisplayPort, and Mobile Industry Processor Interface (MiPi). The internal interfaces may be implemented through at least one of multipoint LVDS (mLVDS) (e.g., ultra slim interface (USI)-F) and enhanced reduced voltage differential signaling (eRVDS) (e.g., USI-GF). LVDS may have a bandwidth of 0.95 gigabit per second (Gbps) per one-pair transmission line as a High-Speed Differential Signal, and a transmission line is added in parallel. LVDS requires a clock transmission line for transmitting clocks in addition to a data transmission line for transmitting data. LVDS has been used for long time as a digital interface and is widely used in electronic devices such as notebooks, PCs, MNT, and TVs. Since LVDS transmits data and clocks as they are, it does not have a content protection function. LVDS uses spread spectrum to reduce electromagnetic interference (EMI).

DisplayPort is managed by Video Electronics Standards Association (VESA), and companies such as Intel, AMD, Samsung, Genesis, and Parade serve as a member for each subcommittee and establish and manage standards. The maximum data transmission line may use up to four transmission lines, and a bandwidth for each transmission line is selected from 1.62/2.7/3.24/5.4 Gbps and transmits data by using American National Standards Institute (ANSI) 8b/10b coding. DisplayPort requires an AUX transmission line for command input/output in addition to a data transmission line. The AUX transmission line may perform two-way communication at 1 mega bit per second (Mbps) speed. DisplayPort uses Manchester II coding. Since DisplayPort uses embedded clocks, a clock transmission line is not required and data scramble, and spread spectrum are used to reduce EMI.

MiPi is an interface generally used in a mobile device (e.g., a phone, a tablet, and a camera) and is driven in a high speed mode, a low power mode, and a command mode.

SUMMARY

The present disclosure provides a display system having a less number of transmission lines and a content protection function and a command input scheme of a display device.

Embodiments of the present disclosure provide a command input scheme including: converting an original pixel data into command embedded pixel data based on a command to control a device, the command being embedded in the command embedded pixel data; transmitting the command embedded pixel data from a host to the device; extracting the command from the command embedded pixel data; and controlling the device according to the extracted command.

In some embodiments, the converting of the original pixel data into the command embedded pixel data may include generating short pixel data and long pixel data of the command embedded pixel data based on the command.

In other embodiments, the short pixel data may correspond to one of binary numbers 0 and 1 of the command, and the long pixel data may correspond to the other one of the binary numbers 0 and 1 of the command.

In still other embodiments, the short pixel data may be configured with a first number of red, green, and blue sub pixel data and an interval; the long pixel data may be configured with a second number of red, green, and blue sub pixel data and the interval; and the first number is a natural number, and the second number is a natural number greater than the first number.

In even other embodiments, the short and long pixel data comprises short and long sub pixel data, respectively; and a first period of each of the long sub pixel data is longer than a second period of each of the short sub pixel data.

In yet other embodiments, the short pixel data may include a first interval; the long pixel data may include a second interval; and the second interval longer than the first interval.

In further embodiments, the converting of the original pixel data into the command embedded pixel data may include: selecting sub seeds corresponding to the command; and scrambling the original pixel data based on the sub seeds.

In still further embodiments, the extracting of the command from the command embedded pixel data may include: separating the sub seeds and the original pixel data from the command embedded pixel data; and converting the sub seeds into the command.

In even further embodiments, the converting of the original pixel data into the command embedded pixel data may include: determining patterns corresponding to the command; and converting the original pixel data into the command embedded pixel data based on the determined patterns.

In yet further embodiments, the extracting of the command from the command embedded pixel data may include: extracting the patterns from the command embedded pixel data; and determining the command corresponding to the extracted patterns.

In yet further embodiments, the patterns may correspond to an ASCII code value.

In yet further embodiment, the determining of the patterns corresponding to the command may include: converting the command into the ASCII code value; and converting the converted ASCII code value into a binary number.

In other embodiments of the present disclosure, display systems include: a host that is configured to convert an original pixel data into command embedded pixel data based on a command and embed the command into the command embedded pixel data,; and a device that is configured to receive the command embedded pixel data from the host and extract the command from the command embedded pixel data, and the device is controlled according to the extracted command.

In some embodiments, the host may generate short pixel data and long pixel data of the command embedded pixel data based on the command.

BRIEF DESCRIPTION OF THE DRAWINGS

The accompanying drawings are included to provide a further understanding of the present disclosure, and are incorporated in and constitute a part of the present disclosure. The drawings illustrate exemplary embodiments of the present disclosure and, together with the description, serve to explain principles of the present disclosure. In the drawings:

FIG. 4B is a view illustrating command transmission using the short and long pixel data shown in FIG. 4A, according to an embodiment of the present disclosure;

DETAILED DESCRIPTION OF THE EMBODIMENTS

Figure 1:
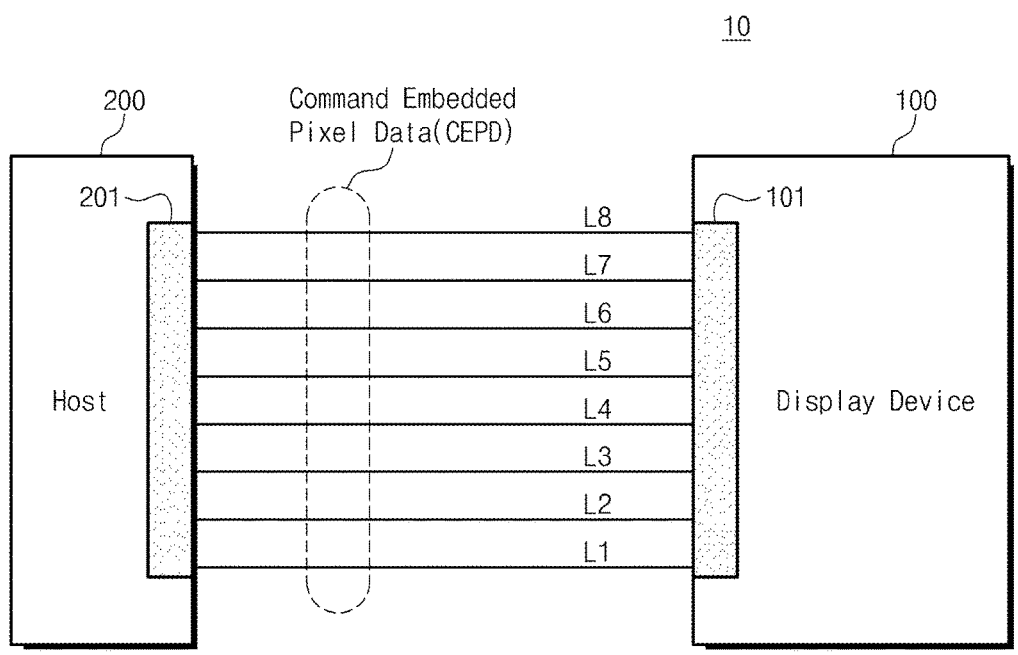
FIG. 1 is a view illustrating a display system, according to an embodiment of the present disclosure.

Various modifications are possible in various embodiments of the present disclosure, and specific embodiments are illustrated in drawings and are described in detail. However, this does not limit various embodiments of the present disclosure to a specific embodiment, and it should be understood that the present disclosure covers various modifications, equivalents, and/or replacements of the present disclosure within the scope of the appended claims and their equivalents.

In describing each drawing, like reference numerals refer to like elements. In the drawings, the thickness or size of each layer may be exaggerated, omitted, or schematically illustrated for convenience in description and clarity. It will be understood that the terms "first" and "second" are used herein to describe various components, but these components should not be limited by these terms. Instead, these terms are used to distinguish one component from the other component. For example, a first component in one embodiment may be exchangeably referred to as a second component in another embodiment and vice versa without departing from the scope of the present disclosure. The terms of a singular form may include a plural form unless they have a clearly different meaning in the context.

Additionally, in this specification, the meaning of "include," "comprise," "including," or "comprising," specifies a property, a region, a fixed number, a step, a process, an element, and/or a component but does not exclude other properties, regions, fixed numbers, steps, processes, elements and/or components. In the following description, it will be understood that when a layer (or film) is referred to as being 'on' another layer or substrate, it can be directly on the other layer or substrate, or one or more intervening layers may be present. On the other hand, it will be understood that when a layer (or film) is referred to as being 'below' another layer or substrate, it can be directly below the other layer or substrate, or one or more intervening layers may be present.

Hereinafter, preferred embodiments of the present disclosure are described in more detail with reference to the accompanying drawings.

A display device of the present disclosure may communicate with an external device through a dual split data transfer protocol for transmitting command embedded pixel data. According to the dual split data transfer protocol of the present disclosure, commands and pixel data may be transmitted in parallel at the same time. Accordingly, a display device does not require a command transmission line for transmitting and receiving commands.

FIG. 1 is a view illustrating a display system 10 according to an embodiment of the present disclosure. The display system 10 includes a display device 100 and a host 200. The display device 100 receives pixel data through a plurality of transmission lines L1 to L8 and displays the pixel data in a frame unit. Although the number of transmission lines L1 to L8 shown in FIG. 1 is 8, the present disclosure is not limited thereto, and other number of transmission lines (e.g., 16, 32, and 64) may be used without deviating from the scope of the present disclosure. The host 200 controls the operations of the display system 10 and transmits the pixel data to the display device 100 to display an image on the display device 100.

As one embodiment of the present disclosure, the host 200 generates command embedded pixel data CEPD by embedding a command in pixel data and transmits the command embedded pixel data CEPD to the display device 100. In an embodiment of the present disclosure, the host 200 is an application processor (AP) or a graphic processor. In addition to the embedded command, a clock may be embedded in the command embedded pixel data CEPD.

In an embodiment of the present disclosure, an interface 101 of the display 100 and an interface 201 of the host 200 exchange data by using the dual split data transfer protocol. For example, the host 200 transmits a command for controlling the display device 100 to the display device 100 through the interfaces 101 and 201.

Since the display system 100 transmits the command embedded pixel data CEPD with an embedded command through the transmission lines L1 to L8, it does not require an additional command transmission line. Additionally, the display system 10 transmits a command and pixel data in parallel simultaneously so that the display system 10 has improved electromagnetic interference (EMI) characteristics and a content protection function.

Herein, one bit of a command according to the dual split data transfer protocol may be determined according to the short and long transmitted pixel data or a pattern of transmitted pixel data, or in addition to that, may be variously determined according to at least one distinguishing feature of the transmitted pixel data. Hereinafter, the dual split data transfer protocol for transmitting a command according to the short and long pixel data will be described in more detail.

Figure 2:
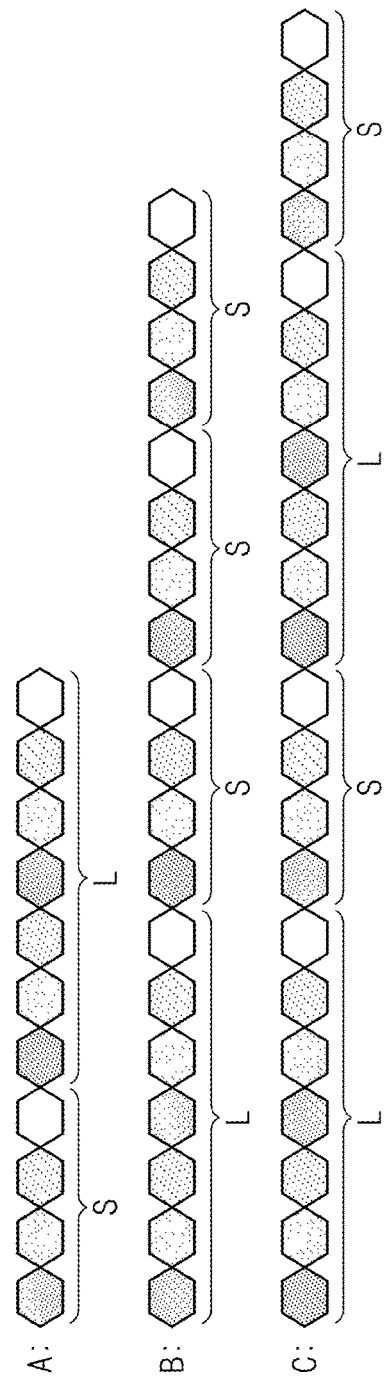
FIG. 2 is a view illustrating a concept for data transmission through a dual split transfer protocol, according to an embodiment of the present disclosure.

FIG. 2 is a view illustrating a concept for data transmission through a dual split transfer protocol, according to an embodiment of the present disclosure. Pixel data may include long pixel data L and short pixel data S. Corresponding characters S and L may be embedded in pixel data according to a combination of the short pixel data S and the long pixel data L.

The dual split data transfer protocol according to an embodiment of the present disclosure uses a protocol similar to a Morse code for performing communication by appropriately combining a short outgoing current and a long outgoing current. In more detail, the dual split data transfer protocol according to an embodiment of the present disclosure may simultaneously transmit pixel data and necessary characters (e.g., a command) in parallel according to the short and long pixel data.

For example, as shown in FIG. 2, in correspondence to the Morse code rules, the alphabet "A" may be expressed in short pixel data S and long pixel data L, the alphabet "B" may be expressed in long pixel data L, a first short pixel data S, a second short pixel data S, and a third short pixel data S, and the alphabet "C" may be expressed in a first long pixel data L, a first short pixel data S, a second long pixel data L, and a second short pixel data S. Although the alphabets "A", "B", and "C" are described exemplarily with reference to FIG. 2, the present disclosure is not limited thereto, and other characters and numbers may be expressed according to the short and long pixel data.

Figure 3A:
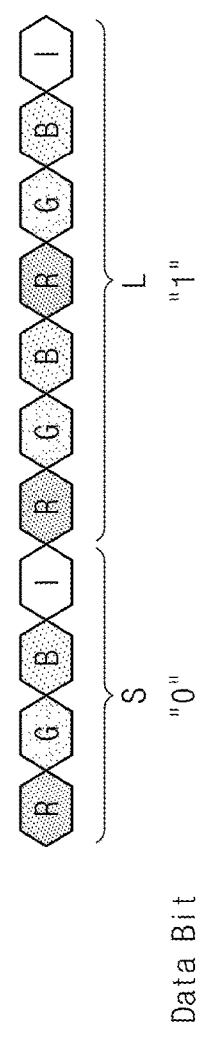
FIG. 3A is a view of short and long pixel data, according to an embodiment of the present disclosure.

FIG. 3A is a view of short and long pixel data, according to an embodiment of the present disclosure. In general, the pixel data may correspond to one pixel (not shown) equipped in the display device 100. Additionally, the pixel data includes red, green, blue sub pixel data R, G, and B respectively corresponding to red, green, and blue sub pixels of each pixel.

Referring to FIG. 3A, the number of red, green, and blue sub pixel data R, G, and B equipped in short pixel data S is less than the number of red, green, and blue sub pixel data R, G, and B equipped in long pixel data L. That is, each of the short pixel data S may include i red, green, blue sub pixel data, and each of the long pixel data L may include k red, green, and blue sub pixel data and the interval. Herein, i is a natural number, and k is a natural number greater than i. For example, the short pixel data S may be configured with one red, green, and blue sub pixel data R, G, and B and one interval I, and the long pixel data L may configured with two red, green, and blue sub pixel data R, G, and B and one interval I.

According to one embodiment, a period including red, green, and blue sub pixel data R, G, B and an interval I is defined by a period definition signal. For example, red, green, and blue sub pixel data R, G, B may be provided during a period where the period definition signal (not shown) has a high level, and an interval I may be provided during a period where the data enable signal has a low level. The period definition signal, for example, may be a data enable signal. In such a way, short and long pixel data S and L may be classified or identified by an interval I, and the number of red, green, and blue sub pixel data R, G, and B included in a period is defined by two consecutive intervals I.

Additionally, data bits are classified according to the short and long pixel data. For example, the short pixel data S and the long pixel data L may respectively correspond to data bits "0" and "1". Additionally, the present disclosure is not limited thereto, and on the other hand, the short pixel data S and the long pixel data L may respectively correspond to data bits "1" and "0".

Figure 3B:
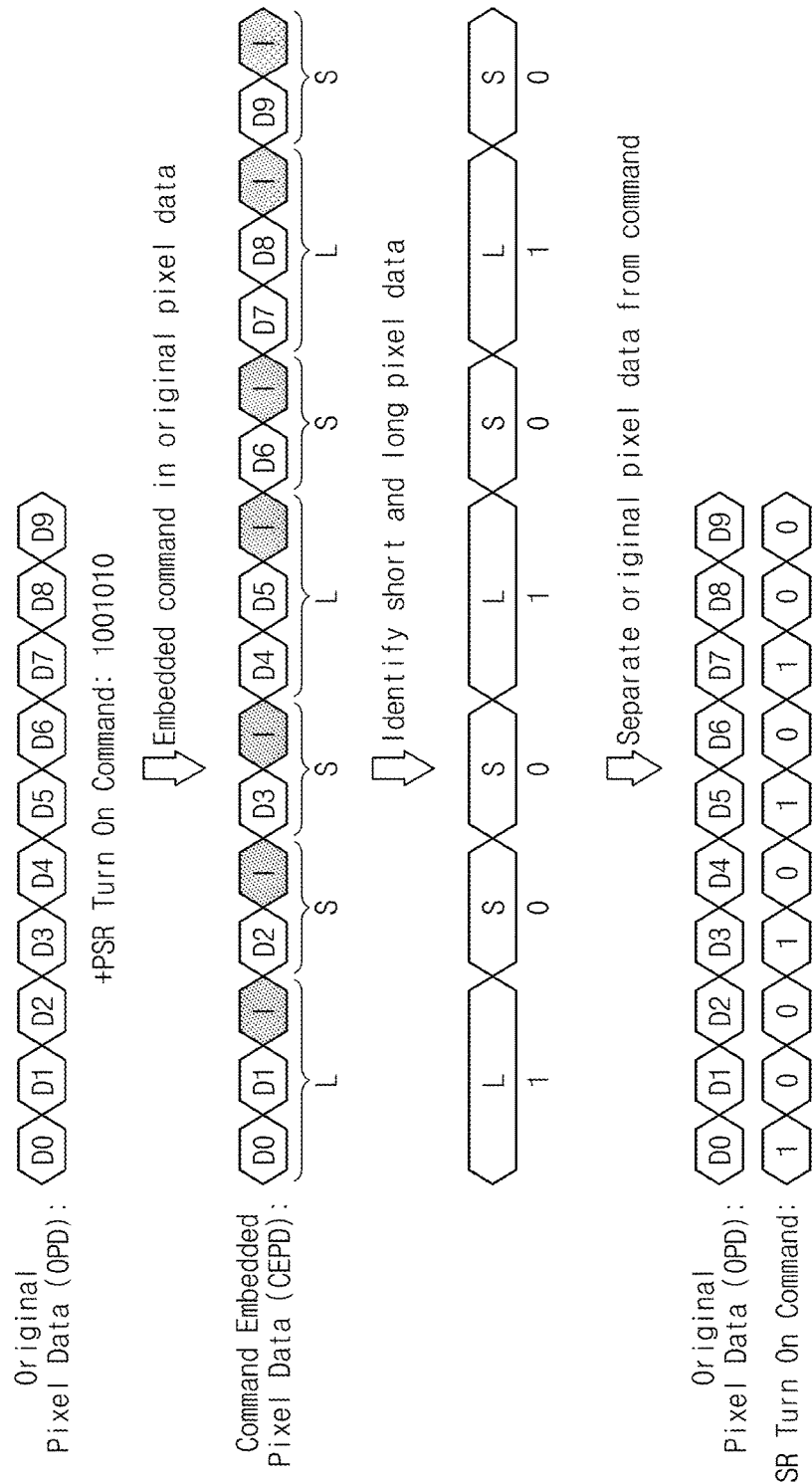
FIG. 3B is a view illustrating command transmission using the short and long pixel data shown in FIG. 3A, according to an embodiment of the present disclosure.

FIG. 3B is a view illustrating command transmission using the short and long pixel data shown in FIG. 3A, according to an embodiment of the present disclosure. For example, a transmitted command is a panel self-refresh (PSR) turn-on command for turning on a PSR function of the display device 100 shown in FIG. 1.

As shown in FIG. 3B, original pixel data OPD includes first to tenth pixel data D0 to D9. According to a combination of the first to tenth pixel data D0 to D9 and a plurality of intervals I, a series of short pixel data S and long pixel data L is defined, and command embedded pixel data CEPD with an embedded command corresponding to the series of the short pixel data S and the long pixel data L is generated. Herein, the short pixel data S and the long pixel data L embedded in the command embedded pixel data CEPD correspond to the PSR turn-on command. As a result, the PSR turn-on command may be embedded in the command embedded pixel data CEPD. As one example, the PSR turn-on command is expressed as "1001010" in a binary number.

In more detail, in the command embedded pixel data CEPD, the first, second, fifth, sixth, eighth, and ninth pixel data D0, D1, D4, D5, D7, and D8 configure long pixel data L and the third, fourth, seventh, and tenth pixel data D2, D3, D6, and D9 configure short pixel data S. In such a way, by generating the short and long pixel data S and L according to a command, the command embedded pixel data CEPD is generated including a command embedded in the original pixel data OPD.

The command embedded pixel data CEPD is transmitted to a device (e.g., the display device 100 of FIG. 1). The display device 100 identifies the short and long pixel data S and L by using an interval I and corresponds "0" and "1" to the short and long pixel data S and L, respectively. On the basis of the identified short and long pixel data S and L, the display device 100 extracts a command by separating the original pixel data OPD and identifies the PSR turn-on command (e.g., 1001010) from the command embedded pixel data CEPD.

Figure 4A:
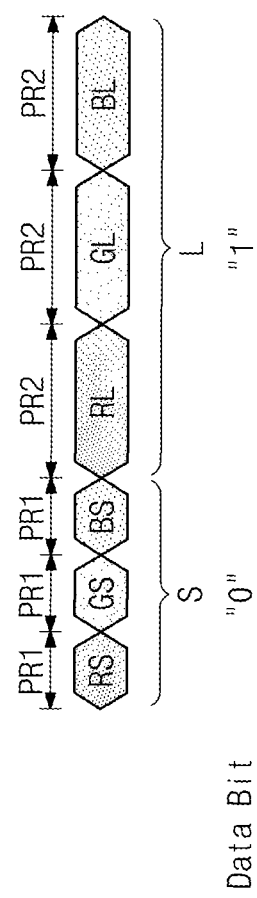
FIG. 4A is a view of short and long pixel data, according to another embodiment of the present disclosure.

FIG. 4A is a view of short and long pixel data, according to another embodiment of the present disclosure. Short pixel data S includes red, green, and blue short sub pixel data RS, GS, and BS and long pixel data L includes red, green, and blue long sub pixel data RL, GL, and BL. Compared to the red, green, and blue short sub pixel data RS, GS, and BS, the red, green, and blue long sub pixel data RL, GL, and BL are implemented with low frequencies. A first period PR1 of each of the red, green, and blue long sub pixel data RL, GL, and BL may be longer than a second period PR2 of each of the red, green, and blue short sub pixel data RS, GS, and BS. However, it is noted that the present disclosure is not limited thereto, and the red, green, and blue long sub pixel data RL, GL, and BL may be implemented with a greater number of bits than the number of bits of the red, green, and blue short sub pixel data RS, GS, and BS. Additionally, although not shown in the drawing, an interval I may be interposed between the short pixel data S and the long pixel data L to distinguish them from each other.

The short and long pixel data S and L may be classified according to short and long sub pixel data RS, GS, BS, RL, GL, and BL. Additionally, data bits are classified according to the short and long pixel data. For example, the short pixel data S and the long pixel data L may respectively correspond to data bits "0" and "1". However, the present disclosure is not limited thereto, and the short pixel data S and the long pixel data L may respectively correspond to data bits "1" and "0".

FIG. 4B is a view illustrating command transmission using the short and long pixel data shown in FIG. 4A, according to an embodiment of the present disclosure. For example, a transmitted command may turn on the PSR function of the display device 100 shown in FIG. 1.

As shown in FIG. 4B, original pixel data OPD includes first to seventh pixel data D0 to D6. The frequency of each of the first to seventh pixel data D0 to D6 is adjusted by a frequency swing. A series of the short pixel data S and long pixel data L is defined by the frequency swing, and command embedded pixel data CEPD with an embedded command corresponding to the series of the short pixel data S and the long pixel data L is generated. Herein, the short pixel data S and the long pixel data L in the command embedded pixel data CEPD are combined to correspond to the PSR turn-on command (e.g., 1001010). As a result, the PSR turn-on command is embedded in the command embedded pixel data CEPD.

In more detail, in the command embedded pixel data CEPD, the first, fourth, and sixth pixel data D0, D3, and D5 configure long pixel data L and the second, third, fifth, and seventh pixel data D1, D2, D4, and D6 configure short pixel data S. In such a way, by generating a particular series of the short and long pixel data S and L, a command can be embedded in the original pixel data OPD, and the command embedded pixel data CEPD can be generated.

The command embedded pixel data CEPD is transmitted to the display device 100. The display device 100 identifies the short and long pixel data S and L by using the frequencies of the short and long pixel data S and L that correspond "1" and "0", respectively. On the basis of the identified short and long pixel data S and L, the display device 100 extracts a command by separating the original pixel data OPD and identifies the PSR turn-on command (e.g., 1001010) from the command embedded pixel data CEPD.

Figure 5A:
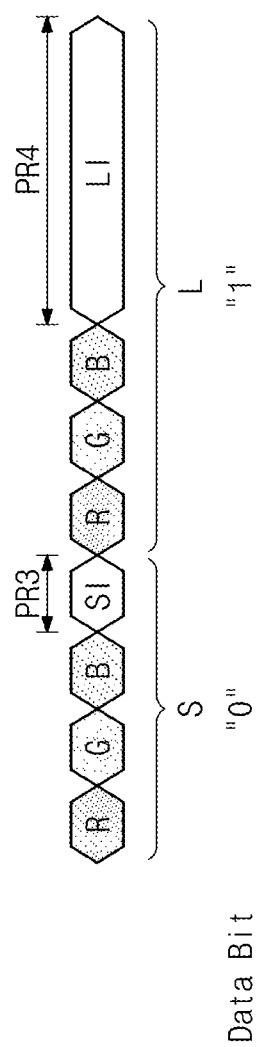
FIG. 5A is a view of short and long pixel data, according to another embodiment of the present disclosure.

FIG. 5A is a view of short and long pixel data, according to another embodiment of the present disclosure. The short pixel data S includes a short interval SI, and the long pixel data L includes a long interval LI. The long interval LI is implemented with a low frequency compared to the short interval SI. Accordingly, a third period PR3 of the short interval SI is shorter than a fourth period PR4 of the long interval LI. In such a way, the short and long pixel data S and L can be classified by the short and long intervals SI and LI. Additionally, data bits are classified according to the short and long pixel data. For example, the short pixel data S and the long pixel data L respectively correspond to data bits "0" and "1". However, the present disclosure is not limited thereto, and the short pixel data S and the long pixel data L may respectively correspond to data bits "1" and "0".

Figure 5B:
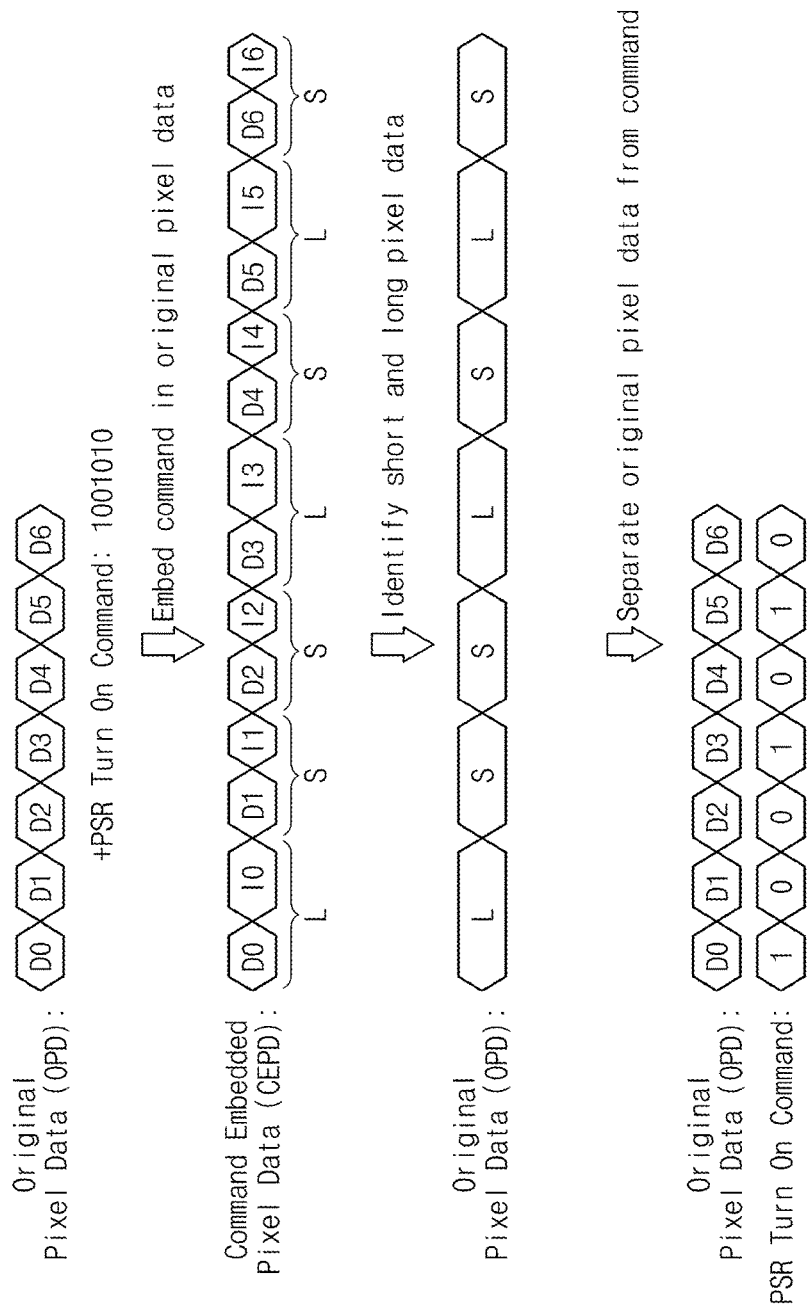
FIG. 5B is a view illustrating command transmission using the short and long pixel data shown in FIG. 5A, according to an embodiment of the present disclosure.

FIG. 5B is a view illustrating command transmission using the short and long pixel data shown in FIG. 5A, according to an embodiment of the present disclosure. For example, a transmitted command may turn on the PSR function of the display device 100 shown in FIG. 1.

As shown in FIG. 5B, original pixel data OPD includes first to seventh pixel data D0 to D6. By adjusting a blank length inserted between the first to seventh pixel data D0 to D6, a series of the short and long pixel data S and L respectively having the short and long intervals SL and SI is defined, and command embedded pixel data CEPD with an embedded command corresponding to the series of the short pixel data S and the long pixel data L is generated.

As an embodiment of the present disclosure, a blank length may be adjusted by using zero padding pixel data having a value corresponding to a horizontal/vertical (H/V) blank or a zero grayscale. For example, a blank length is adjusted by a frequency change or a blank number adjustment. Herein, the short pixel data S and the long pixel data L in the command embedded pixel data CEPD are combined to correspond to the PSR turn-on command (e.g., 1001010). As a result, the PSR turn-on command is be embedded in the command embedded pixel data CEPD.

In more detail, first, fourth, and sixth intervals I0, I3, and I5 are long intervals LI, and second, third, fifth, and seventh intervals I1, I2, I4, and I6 are short intervals SI. Accordingly, in the command embedded pixel data CEPD, the first, fourth, and sixth pixel data D0, D3, and D5 and the first, fourth, and sixth intervals I0, I3, and I5 configure long pixel data L, and the second, third, fifth, and seventh pixel data D1, D2, D4, and D6 and the second, third, fifth, and seventh intervals I1, I2, I4, and I6 configure short pixel data S. In such a way, generating series of the short and long pixel data S and L is generated according to a command, the command can be embedded in the original pixel data OPD, and the command embedded pixel data CEPD can be generated.

The command embedded pixel data CEPD is transmitted to the display device 100. The display device 100 identifies the short and long pixel data S and L by using different frequencies of the short and long intervals SI and LI that correspond "0" and "1", respectively. On the basis of the identified short and long pixel data S and L, the display device 100 extracts a command by separating the original pixel data OPD and the PSR turn-on command (e.g., 1001010) from the command embedded pixel data CEPD.

Figure 6:
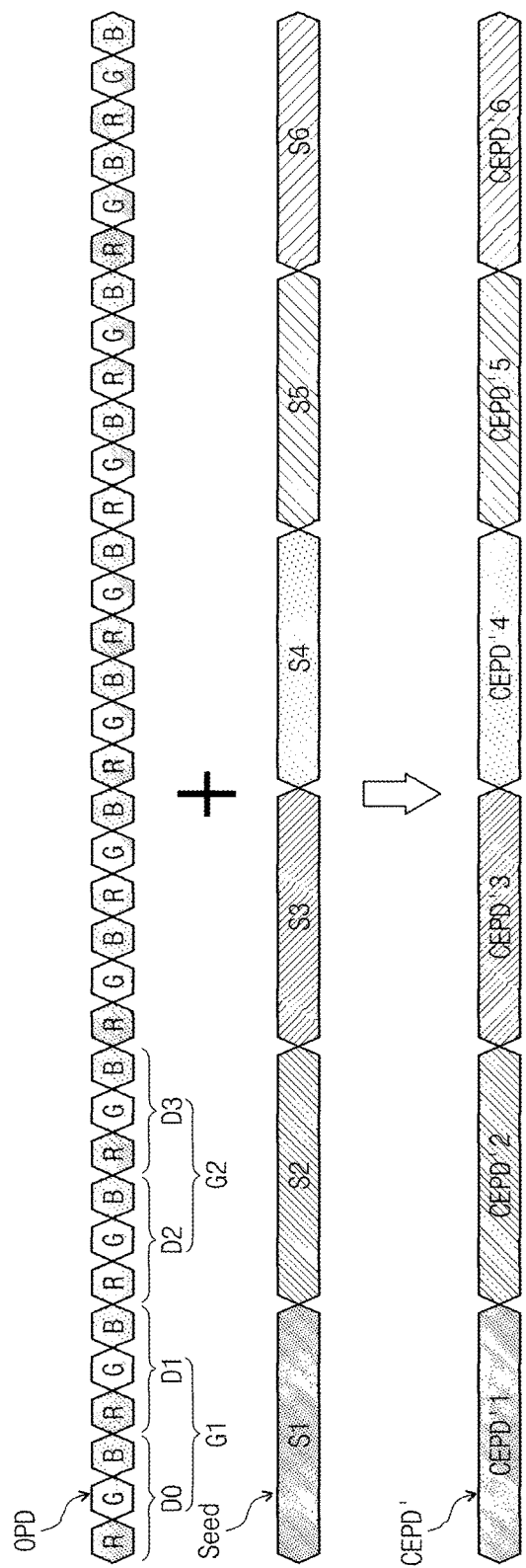
FIG. 6 is a view illustrating a scrambling scheme for generating command embedded pixel data, according to an embodiment of the present disclosure.

FIG. 6 is a view illustrating a scrambling scheme for generating command embedded pixel data, according to another embodiment of the present disclosure. Command embedded pixel data CEPD' is generated by scrambling original pixel data OPD and a seed. The original pixel data OPD may be converted into the command embedded pixel data CEPD' on the basis of the seed.

In more detail, the seed includes a plurality of sub seeds. Information on the plurality of sub seeds may be pre-stored in the host 200 shown in FIG. 1 and the display device 100 shown in FIG. 1. First, sub seeds used for converting pixel data in original pixel data OPD into the command embedded pixel data CEPD' are selected. For example, first to sixth sub seeds S1 to S6 is selected from sub seeds to correspond to a command.

The original pixel data OPD are grouped by two pixel data unit. For example, first and second pixel data D0 and D1 are grouped into a first group G1 and third and fourth pixel data D2 and D3 are grouped into a second group G2. The groups correspond to one of the first to sixth sub seeds S1 to S6, and each group is scrambled by a corresponding sub seed. For example, the first and second pixel data D0 and D1 of the first group G1 correspond to the first sub seed S1, and the order of the sub pixel data R, G, and B in the first and second pixel data D0 and D1 is scrambled according to the first sub seed S1. In the same manner, the third and fourth pixel data D2 and D3 of the second group G2 correspond to the second sub seed S2, and the order of the sub pixel data R, G, and B in the third and fourth pixel data D2 and D3 is scrambled according to the second sub seed S2.

The first to sixth sub command embedded pixel data CEPD' 1 to CEPD' 6 of the command embedded pixel data CEPD' include the values of the scrambled first to sixth groups G1 to G6, respectively. In such a way, original pixel data OPD is scrambled by using the first to sixth sub seeds S1 to S6 to generate the command embedded pixel data CEPD'.

Figure 7:
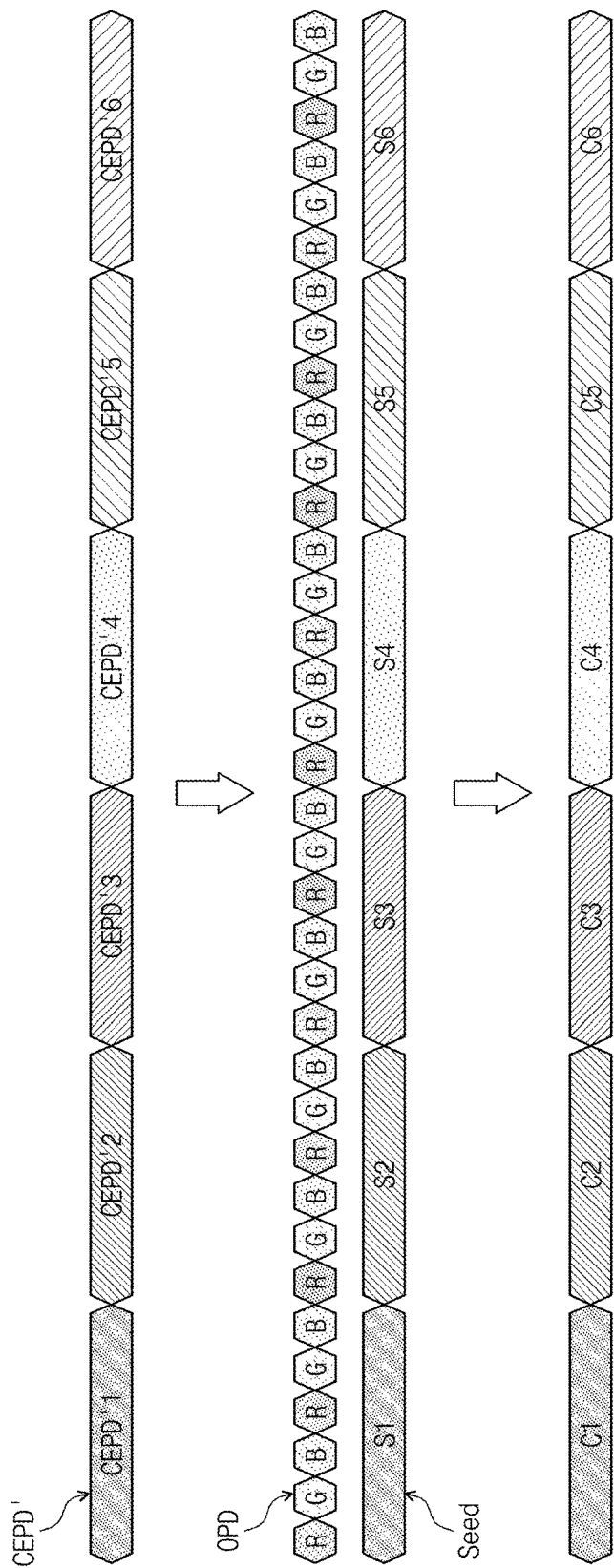
FIG. 7 is a view illustrating an unscrambling scheme for separating a command from command embedded pixel data, according to another embodiment of the present disclosure.

FIG. 7 is a view illustrating an unscrambling scheme for separating a command from command embedded pixel data, according to another embodiment of the present disclosure. The display device 100 shown in FIG. 1 receives the command embedded pixel data CEPD', extracts original pixel data OPD and a seed through a data recovery process, and converts the extracted seed into a command. In more detail, the first to sixth sub seeds S1 to S6 are respectively converted into first to sixth commands C1 to C6. A correspondence relationship between such sub seeds and commands may be predetermined and pre-stored in the display device 100 and the host 200 shown in FIG. 1.

Figure 8:
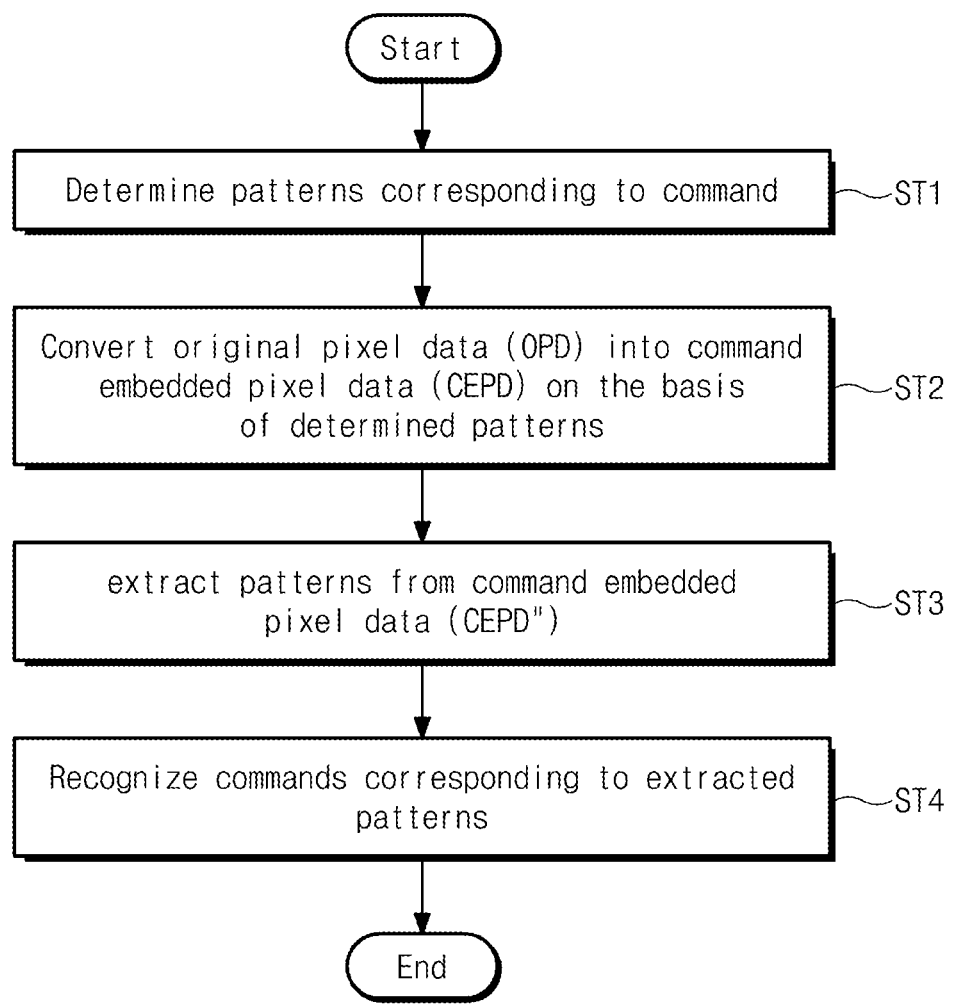
FIG. 8 is a flowchart illustrating a patterning scheme for generating command embedded pixel data, according to another embodiment of the present disclosure.

FIG. 8 is a flowchart illustrating a patterning scheme for generating command embedded pixel data, according to another embodiment of the present disclosure. A command is embedded in pixel data through the short and long patterns (also referred to as patterns) of pixel data. The patterns may be pre-stored in the host 200 shown in FIG. 1 and the display device 100 shown in FIG. 1 to correspond to a command. The host 200 determines the patterns corresponding to a command in operation ST1 and converts original pixel data OPD into command embedded pixel data CEPD" on the basis of the patterns corresponding to the host 200 in operation ST2. The display device 100 receives the command embedded pixel data CEPD" and extracts the patterns from the command embedded pixel data CEPD" in operation ST3. The display 100 recognizes a command corresponding to the extracted patterns in operation ST4. A pattern configuration shown in FIG. 8 is just an embodiment, and it is understood that the patterns of pixel data for embedding a command may be implemented variously without deviating from the scope of the present disclosure.

Figure 9:
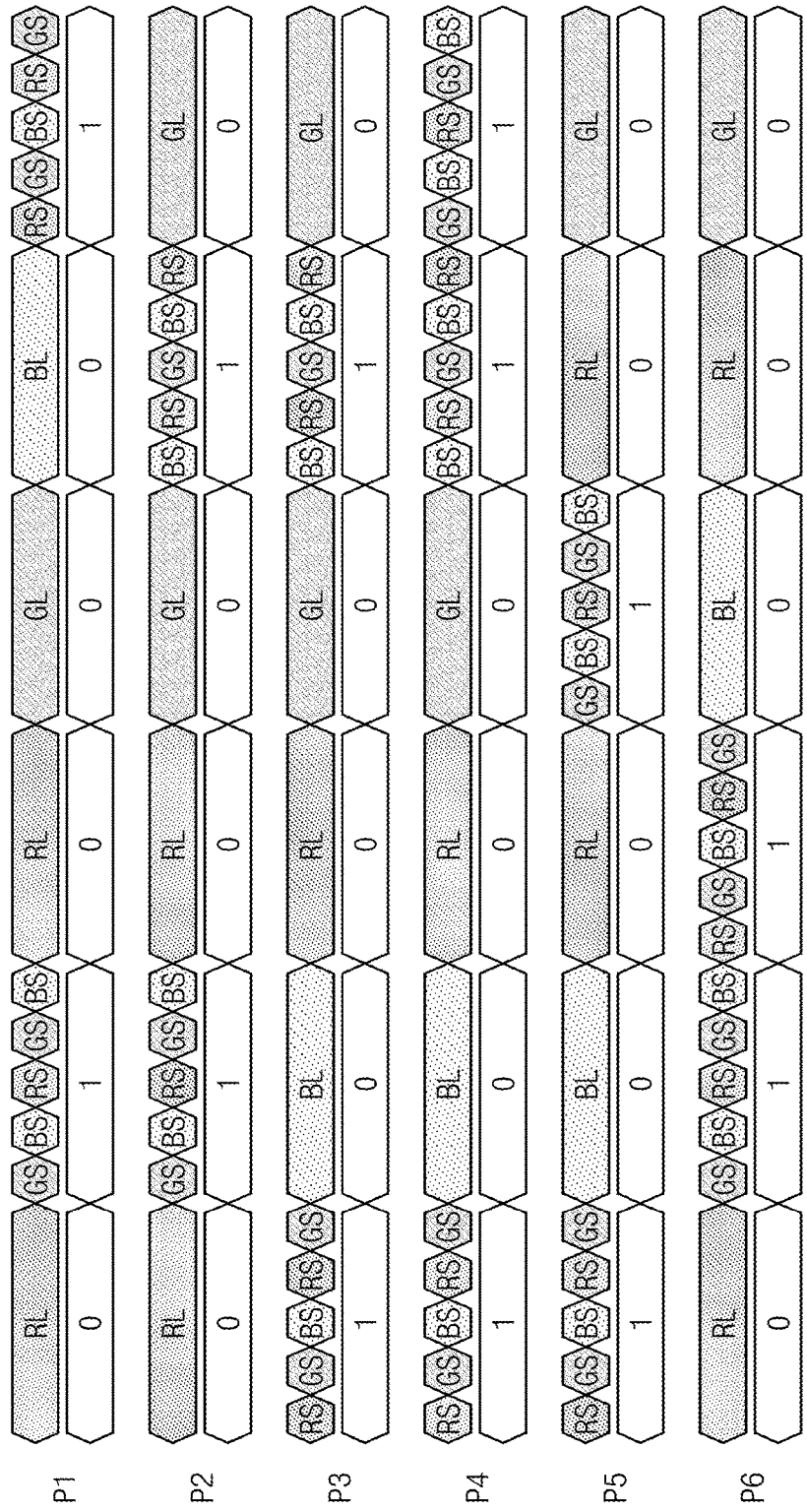
FIG. 9 is a view illustrating a pattern used for generating command embedded pixel data, according to another embodiment of the present disclosure.

FIG. 9 is a view illustrating a pattern used for generating command embedded pixel data, according to another embodiment of the present disclosure. The short and long pixel data may be implemented by short and long sub pixel data RS, GS, BS, RL, GL, and BL as described with reference to FIG. 4A. However, the present disclosure is not limited thereto, and it is understood that the short and long pixel data can be implemented variously, for example, through the embodiments described with reference to FIGS. 3A and 5A. Additionally, as shown in FIG. 9, the short sub pixel data RS, GS, and BS correspond to the data bit "1", and the long sub pixel data RL, GL, and BL correspond to the data bit "0".

As an embodiment of the present disclosure, the patterns of pixel data may correspond to an ASCII code. For example, a first pattern P1 generated by the short and long pixel data is "010001" may correspond to DC1 of ASCII code. Similarly, the second to sixth patterns P2 to P6 are "010010", "100010", "100011", "100100", and "011000" may respectively correspond to ASCII codes, DC2, ", ', $, and CAN. Although not shown in the drawing, other ASCII codes may be predetermined to respectively correspond to different patterns.

Figure 10:
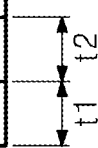
FIG. 10 is a table illustrating command embedded pixel data generated by patterns, according to an embodiment of the present disclosure.

FIG. 10 is a table illustrating command embedded pixel data generated by patterns, according to an embodiment of the present disclosure. For convenience of description, a string "write(page0, 0a, 4f)" is formed by a combination of commands is exemplarily described.

In this case, commands converted into ASCII codes, include strings of 0×77, 0×72, 0×69, 0×74, 0×65, 0×28, 0×70, 0×61, 0×67, 0×65, 0×30, 0×2C, 0×30, 0×61, 0×2C, 0×34, 0×66, 0×29, and 0×3B. When the converted ASCII code value is converted into a binary numeral, patterns corresponding to the string command "write(page0, 0a, 4f)" is generated including a series of commands, 01110111, 01110010, 01101001, 01110100, 01100101, 00101000, 01110000, 01100001, 01100111, 01100101, 00110000, 00101100, 00110000, 01100001, 00101100, 00110100, 01100110, and 00101001.

As an embodiment of the present disclosure, patterns corresponding to commands may be transmitted in parallel through first to eighth transmission lines L1 to L8. For example, during a first period t1, the pattern "01110111" corresponding to the command "w" may be transmitted through the first to eighth transmission lines L1 to L8. Similarly, during a second period t2 following the first period t1, the pattern "01110010" corresponding to the command "r" may be transmitted through the first to eighth transmission lines L1 to L8. In such a way, the display device 100 receiving patterns can extract the string "write (page0, 0a, 4f)" configured by a series of commands through the patterns.

Figure 11:
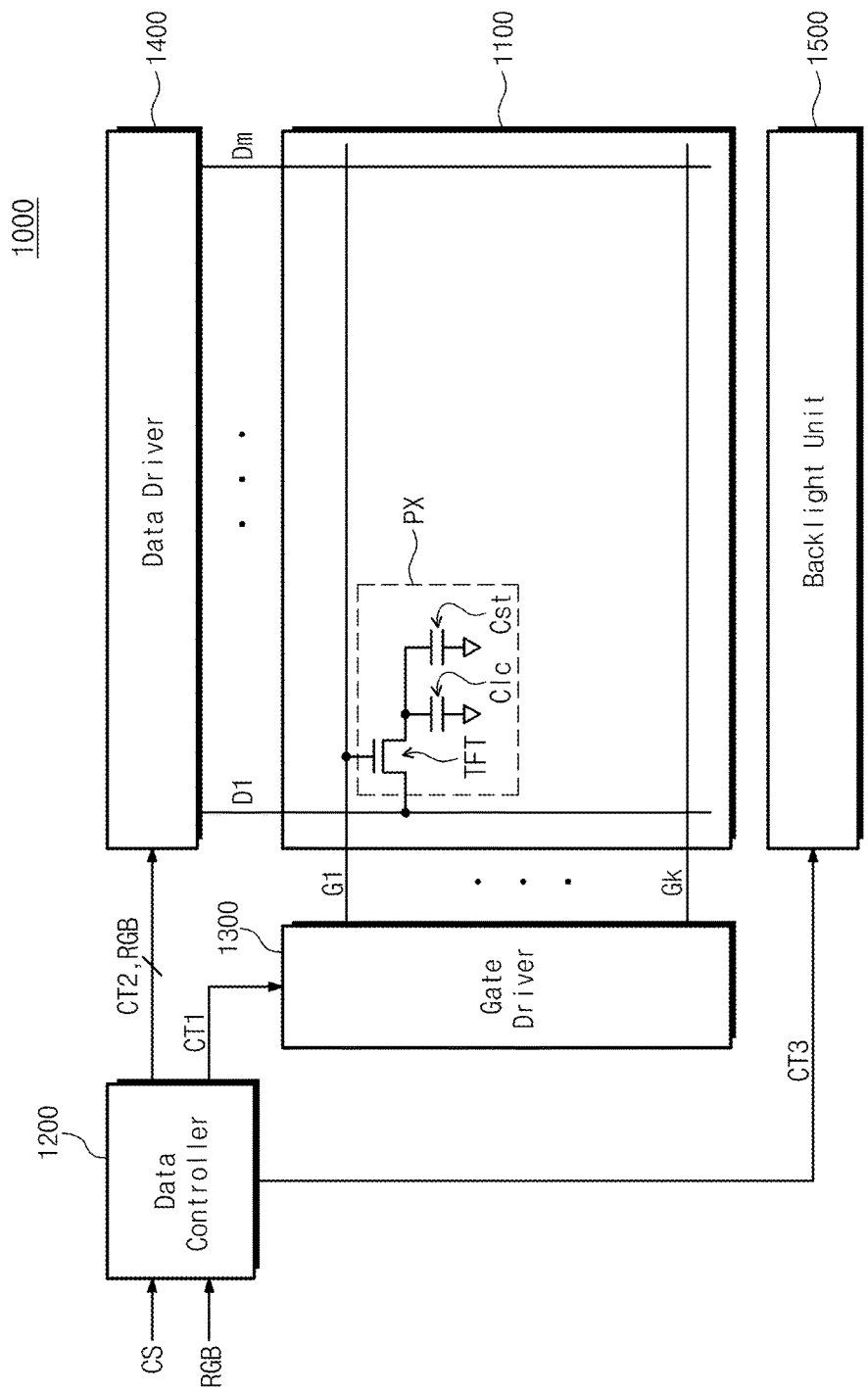
FIG. 11 is a block diagram of a display device, according to an embodiment of the present disclosure.

FIG. 11 is a block diagram of a display device 1000, according to an embodiment of the present disclosure. The display device 1000 includes a display panel 1100, a timing controller 1200, a gate driver 1300, a data driver 1400, and a backlight unit 1500.

The display panel 1100 displays an image. The display panel 1100 may be a passive type display panel requiring a light source of a self-emitting active type display panel. For example, the display panel 1100 may be a liquid crystal display panel, an electrophoretic display panel, and an electrowetting display panel. Hereinafter, a liquid crystal display panel including a liquid crystal display layer between two substrates is exemplarily described. However, although not shown in the drawing, a display device including a liquid crystal display panel may further include a pair of polarizing plates.

The display panel 1100 includes a plurality of gate lines GL1 to GLk receiving gate signals and a plurality of data lines DL1 to DLm receiving data voltages. The gate lines GL1 to GLk and the data lines DL1 to DLm are insulated from each other and intersect each other. A plurality of pixel areas arranged in a matrix are defined in the display panel 1100, and a plurality of pixels are equipped in each of a plurality of pixel areas. An equivalent circuit of one pixel PX among pixels is exemplarily shown in FIG. 11. The pixel PX includes a thin film transistor TFT, a liquid crystal capacitor Clc, and a storage capacitor Cst. Although not shown in the drawing, the thin film transistor TFT includes a gate electrode, a source electrode, and a drain electrode. The gate electrode is connected to the first gate line GL1 among the gate lines GL1 to GLk. The source electrode is connected to the first data line DL1 among the data lines DL1 to DLm. The drain electrode is connected to the liquid crystal capacitor Clc and the storage capacitor Cst. The liquid crystal capacitor Clc and the storage capacitor Cst are connected in parallel to the drain electrode.

Additionally, the display panel 1100 includes a first display substrate, a second display substrate facing the first display substrate, and a liquid crystal layer interposed between the first display substrate and the second display substrate. The gate lines GL1 to GLk, the data lines DL1 to DLm, the thin film transistor TFT, and the first electrode (not shown) of the liquid crystal capacitor Clc are formed on the first display substrate. The thin film transistor TFT applies a data voltage to the first electrode in response to a gate signal. The second electrode (not shown) of the liquid crystal capacitor Clc is formed on the second display substrate, and a reference voltage is applied to the second electrode. The liquid crystal layer serves as a dielectric layer between the first electrode and the second electrode. A voltage corresponding to a potential difference of a data voltage and a reference voltage is charged to the liquid crystal capacitor Clc.

The timing controller 1200 receives image data RGB, a command, and a control signal CS from an external graphic controller (e.g., the host 200 of FIG. 1). Herein, in addition to the command, the control signal CS may be transmitted by using a dual split data transfer protocol implemented through various protocols such as a Morse code, a scramble scheme, and data patterning as described above.

The timing controller 1200 receives a control signal CS, for example, a vertical synch signal, a horizontal synch signal, a main clock, and a data enable signal, and outputs a first control signal CT1, a second control signal CT2, and a third control signal CT3. The first control signal CT1 is a gate control signal for controlling an operation of the gate driver 1300. The first control signal CT1 may include a gate clock and a vertical start signal. The timing controller 1200 generates a base clock and a gate enable signal from a control signal CS, and generates a gate clock on the basis of the base clock and the gate enable signal.

Additionally, the second control signal CT2 is a data control signal for controlling an operation of the data driver 1400. The second control signal CT2 includes a horizontal start signal for starting an operation of the data driver 1400, an inversion signal for inverting the polarity of a data voltage, and an output indication signal for determining the timing for outputting a data voltage from the data driver 1400. The third control signal CT3 is a signal for controlling an operation of the backlight unit 1500. The third control signal CT3 may include a backlight control signal for determining a turn-on period and a turn-off period of the backlight unit 1500.

The gate driver 1300 is electrically connected to the gate lines GL1 to GLk equipped in the display panel 1100 and provides gate signals to the gate lines GL1 to GLk. In more detail, the gate driver 1300 generates a gate signal for driving the gate lines GL1 to GLk on the basis of a first control signal CT1 and sequentially outputs the generated gate signal to the gate lines GL1 to GLk. The gate signal may include a normal gate signal and a modulation gate signal having different pulse widths.

The data driver 1400 outputs a data voltage (or a grayscale voltage) converted from pixel data included in image data RGB to the data lines DL1 to DLm on the basis of the second control signal CT2. The backlight unit 1500 is provided on a rear side of the display panel 1100 to provide light to the display panel 1100. The backlight unit 1500 performs a blanking operation on the basis of the third control signal CT3 and repeats a turn-on and turn-off operation at predetermined period units. The backlight unit 1500 may perform one turn-on operation and one turn-off operation during one period. A driving frequency of the backlight unit 1500 may be integer times of a driving frequency of the display panel 1100.

When using a dual split data transfer protocol according to an embodiment of the present disclosure, the following effects may be expected. First, the number of transmission lines is reduced. In more detail, a command is transmitted through a data transmission line, and a command transmission line for transmitting a command is omitted. An AUX line may be omitted by embedding a command transmitted through the AUX line in pixel data. The number of data transmission lines can be reduced because, the data interfaces of the present disclosure become speedier. When a command transmission line is used as a data transmission line for additional streaming, for example, in the case of DisplayPort, a data transmission line is increased from four pairs to five pairs, so that a larger amount of data, that is 1.25 times more than before, can be transmitted.

Second, EMI characteristics of a display device is improved. When using the data scramble of DisplayPort, EMI characteristics are reduced by about 7 dB. The present scrambling scheme randomizes data by scrambling the data. Accordingly, the scrambled data can effectively prevent a specific frequency from being dominant. In addition, during pixel data transmission, similar effects to changing a frequency may be obtained by transmitting data or changing a data length through method similar scheme as spread spectrum as modulating a frequency. A data transmission scheme that has a faster data transmission rate may reduce the number of lines but such a scheme may have an inferior EMI characteristics due to the faster data transmission rate. Due to the above-mentioned characteristics for EMI reduction, the present data transmission scheme has an improved EMI characteristics without an additional action such as a power IC part slew control, a PCB wiring change, and component mounting for characteristic improvement. Thus, a seamless product/component development is possible.

Third, a content protection function is enhanced. When a content protection function is performed through a general content protection scheme, it is likely to be exposed to data copy. However, according to the present disclosure, a speed for decoding is continuously changed according to a command transmitted in real-time, therefore a corresponding command and a correspondence relationship for decoding are required. Accordingly, data copy is almost impossible. In comparison to the existing data protection scheme, the present disclosure further enhances the security of transmitted data.

Fourth, a real-time monitoring function is enhanced. It is difficult for an interface such as DisplayPort to find a signal issued at a transmission time. This is because the signal is difficult to probe due to the speed of the signal, and the measurement of the waveform is difficult due to impedance issues during signal probing. Additionally, since signals are encoded and transmitted during transmission, it is difficult to identify the transmitted data even during probing. In contrast, according to the present disclosure, it is possible to easily know such signal issues. Since a command is carried through a transmission line, when clues for pixel data are carried in a corresponding command, the command part of corresponding pixel data may be problematic with respect to a part that causes a problem. Accordingly, data in which a problem occurs and a time of such problem occurrence are easily identifiable. As a result, signal problems may be easily found in an interface such as DisplayPort.

Fifth, simultaneous data transmission is possible. It is possible to transmit data dually at the same time. Signals requiring high speed transmission (e.g., streaming data) are transmitted through a general data transmission protocol, and a relatively low-speed data transmission is performed through a dual split data transfer protocol of the present disclosure, so that two types of data may be transmitted/received in parallel at the same time through the same data transmission line.

Sixth, a command function is implemented in data. In an interface for performing a simple data streaming function without an additional command transmission function such as LVDS, a command transmission function cab be easily implemented.

A dual split data transfer protocol of the present disclosure may save data lines and improve EMI characteristics Since the dual split data transfer protocol also transmits data in parallel through one transmission line or uses a command transmission function in a protocol having no command transmission function, the dual split data transfer protocol can be applied to an interface conversion board used during mass production, so that a production cost may be reduced significantly.

As mentioned above, a display system and a command input scheme of a display device according to the present disclosure transmit command embedded pixel data through a dual split data transfer protocol. Therefore, the number of transmission lines required for a display system can be reduced, and a command input scheme of a display device provides improved EMI characteristics while implementing a security function of a display system and enhancing a command input scheme of the display device.

The above-disclosed subject matter is to be considered illustrative and not restrictive, and the appended claims are intended to cover modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A command input method comprising:
    converting an original pixel data into command embedded pixel data based on a command to control a device, the command being embedded in the command embedded pixel data;
    transmitting the command embedded pixel data from a host to the device;
    extracting the command from the command embedded pixel data; and
    controlling the device according to the extracted command,
    wherein the converting of the original pixel data into the command embedded pixel data comprises generating short pixel data and long pixel data of the command embedded pixel data based on the command,
    wherein the short and long pixel data comprise short and log sub pixel data, respectively, and
    wherein a first period of each of the long sub pixel data is longer than a second period of each of the short sub pixel data.

2. The method of claim 1, wherein the short pixel data corresponds to one of binary numbers 0 and 1 of the command, and the long pixel data corresponds to the other one of the binary numbers 0 and 1 of the command.

3. The method of claim 2, wherein the short pixel data is configured with a first number of red, green, and blue sub pixel data and an interval,
    wherein the long pixel data is configured with a second number of red, green, and blue sub pixel data and the interval, and
    wherein the first number is a natural number and the second number is a natural number greater than the first number.

4. The method of claim 2, wherein
    the short pixel data comprises a first interval,
    the long pixel data comprises a second interval, and
    the second interval is longer than the first interval.

5. The method of claim 1, wherein the converting of the original pixel data into the command embedded pixel data comprises:
    selecting sub seeds corresponding to the command; and
    scrambling the original pixel data based on the sub seeds.

6. The method of claim 5, wherein the extracting of the command from the command embedded pixel data comprises:
    separating the sub seeds and the original pixel data from the command embedded pixel data; and
    converting the sub seeds into the command.

7. A command method comprising:
    converting an original pixel data into command embedded pixel data based on a command to control a device, the command being embedded in the command embedded pixel data;
    transmitting the command embedded pixel data from a host to the device;
    extracting the command from the command embedded pixel data; and
    controlling the device according to the extracted command,
    wherein the converting of the original pixel data into the command embedded pixel data comprises:
    determining patterns corresponding to the command; and
    converting the original pixel data into the command embedded pixel data based on the determined patterns.

8. The method of claim 7, wherein the extracting of the command from the command embedded pixel data comprises:
    extracting the patterns from the command embedded pixel data; and
    determining the command corresponding to the extracted patterns.

9. The method of claim 8, wherein the patterns correspond to an ASCII code value.

10. The method of claim 9, wherein the determining of the patterns corresponding to the command comprises:
    converting the command into the ASCII code value; and
    converting the converted ASCII code value into a binary number.

11. A display system comprising:
    a host configured to convert an original pixel data into command embedded pixel data based on a command and embed the command into the command embedded pixel data; and
    a device that is configured to receive the command embedded pixel data from the host and extract the command from the command embedded pixel data,
    wherein the host is further configured to generate short pixel data and long pixel data of the command embedded pixel data based on the command,
    wherein the short and long pixel data comprise short and log sub pixel data, respectively,
    wherein a first period of each of the long sub pixel data is longer than a second period of each of the short sub pixel data, and
    wherein the device is controlled according to the extracted command.

* * * * *

UNITED STATES PATENT AND TRADEMARK OFFICE
CERTIFICATE OF CORRECTION

PATENT NO. : 10,163,182 B2  
APPLICATION NO. : 14/994012  
DATED : January 12, 2016  
INVENTOR(S) : Gyeong-ub Moon et al.

Page 1 of 1

It is certified that error appears in the above-identified patent and that said Letters Patent is hereby corrected as shown below:

On the Title Page

The name of the Assignee should read as "Samsung Display Co., Ltd.", not "Innovation Counsel LLP"

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*